United States Patent [19]

Sekine

[11] Patent Number: 5,355,510

[45] Date of Patent: Oct. 11, 1994

[54] INFORMATION PROCESS SYSTEM

[75] Inventor: Masatoshi Sekine, Kanagawa, Japan

[73] Assignee: Kabushiki Kaisha Toshiba, Kawasaki, Japan

[21] Appl. No.: 185,154

[22] Filed: Jan. 24, 1994

Related U.S. Application Data

[63] Continuation of Ser. No. 589,505, Sep. 28, 1990, abandoned.

[30] Foreign Application Priority Data

Sep. 30, 1989 [JP] Japan .................................. 1-255472
Apr. 19, 1990 [JP] Japan .................................. 2-103701

[51] Int. Cl.$^5$ .............................................. G06F 5/00
[52] U.S. Cl. .................................... 395/800; 364/259
[58] Field of Search .......................................... 395/800

[56] References Cited

U.S. PATENT DOCUMENTS

| | | | |
|---|---|---|---|
| 3,662,346 | 5/1972 | Tada | 364/900 |
| 3,694,813 | 9/1972 | Loh | 364/200 |
| 3,859,514 | 1/1975 | Kashio | 364/900 |

OTHER PUBLICATIONS

S. Inomata, et al., "Reductions in Number of Bits for Digital Error Back Propagation Model", Shingaku Giho, NC89-41, pp. 51-56 (1989).
M. Abeles, et al., "Firing Patterns of Single Units in the Prefrontal Cortex and Neural Network network models"., Network 1, 1990, pp. 13-25.
S. Amari, "Characteristics of Random Nets of Analog Neuron-Like Elements", IEEE Transactions on Systems, Man and Cybenetics, vol. SMC-2, No. 5, Nov., 1972, pp. 643-657.

*Primary Examiner*—David Y. Eng
*Attorney, Agent, or Firm*—Foley & Lardner

[57] ABSTRACT

A process system more efficiently processes information composed of significant information and insignificant information. The system includes an input portion which selects significant information from information inputted through a plurality of input terminals. The system recognizes each significance degree which indicate a time duration of the significant information as a value showing an input state. An operation circuit carries out a predetermined logic operation for the significant information propagated from the input portion. An output portion compares each significance degree of the significant information obtained from the logic operation results of the operation circuit with a predetermined threshold value. The output portion recognizes each significance degree obtained from the logic operation result as a value indicating an output state. When the significance degree is greater than the threshold value the output portion outputs significant information having the significance degree and outputs insignificant information when the significance degree is less than the threshold value.

9 Claims, 7 Drawing Sheets

| IN | | | | OUT | | |
|---|---|---|---|---|---|---|
| A | Ai | Aj | An | C (−) | C | C (+dt) |
| 0 | 0 | 0 | 0 | 0 | 0 | 0 |
| 1 | 0 | 0 | 0 | 0 | 0 | 0 |
| 1 | 1 | (−)1 | 0 | 0 | 0 | 0 |
| | | | THRESHOLD | | | |
| 1 | 1 | 0 | 1 | 0 | 1 | 0 |

FIG.2

NOT OPERATION

| INPUT (IN) | OUTPUT (OUT) |
|---|---|
| 1 | 0 |

FIG.3

AND OPERATION

| INPUT (IN) | | OUTPUT (OUT) | | |
|---|---|---|---|---|
| A (t) | B (t) | C (t−1) | C (t) | C (t+dt) |
| 0 | 0 | 0 | 0 | 0 |
| 0 | 1 | 0 | 0 | 0 |
| 1 | 0 | 0 | 0 | 0 |
| 1 | 1 | 0 | 1 | 0 |

FIG.4

OR OPERATION

| INPUT (IN) | | OUTPUT (OUT) | | |
|---|---|---|---|---|
| A (t) | B (t) | C (t−1) | C (t) | C (t+dt) |
| 0 | 0 | 0 | 0 | 0 |
| 0 | 1 | 0 | 1 | 0 |
| 1 | 0 | 0 | 1 | 0 |
| 1 | 1 | 0 | 1 | 0 |

LEARNING SENSITIVITIES OF THE INPUT PORTION

LEARNING SENSITIVITIES OF THE OUTPUT PORTION

INFORMATION PROCESS SYSTEM

This application is a continuation of application Ser. No. 07/589,505, filed Sep. 28, 1990, now abandoned.

BACKGROUND OF THE INVENTION

1. Field of the Invention

The present invention relates an information process system able to carry out an information process by propagating significant information (necessary information) obtained from a logic operation result.

2. Description of the Prior Art

Generally, conventional information process systems carry out a process of information which is coded with binary values, for example "1", "0". In such an information process, both of the binary information "1", "0" have the same significance (weight), thus these binary values "1", "0" included in a logic operation result are propagated to a higher process stage.

Such a process system works effectively until a stage where information is taken in a logic system. However, when the information taken in is processed in the logic system, all the process results are propagated to the final process stage together. Therefore, with an increase of the contents to be processed and the amount of information, the information process becomes more complex and the construction of the information process system must be made more large-scaled and complicated than ever. As a result, the design work of an process circuits becomes more and more difficult.

To avoid the complexity of information processing in the logic system, there is a method of process only significant information (necessary information) obtained from a process result as well as expressing the information correctly. However, since the function of processing only significant information is completely different from that of correctly expressing information, it is very difficult to express it by a Boolean operation formula composed of the logical product (AND), logical sum (OR) and the like used in a conventional logic system.

Moreover, to carry out an information process efficiently by such a significant information process, it is necessary to suppress propagation of insignificant information (unnecessary information).

To realize this object, there is a known method which is so constructed that only when significant information can be obtained from an information process in a first stage, is the next information process requested of a process circuit in a second stage. In such a method, a so-called hand-shake method based on input-output of a request signal and an acknowledgement signal is carried out.

However, with an increase of the process information and process contents, it becomes extremely difficult to construct an information process system based on the handshake method.

On the other hand, there is a known information processing system for process only significant information, which comprises connecting a plurality of threshold value elements for selectively controlling threshold values.

In this system, significant information is recognized as information obtained from some of the threshold value elements from which a relatively large output is generated as compared with that from the remaining elements. Moreover, the information is obtained by selectively lowering threshold values of, or selectively enlarging the weight factor of an input to, the specific elements. Namely, in such a system, the significant information is preferentially propagated to carry out a learning process (Hebb's learning rule).

However, in such a learning process, only the output from the elements is considered, and the input thereto is not paid attention to. Therefore, it is impossible to obtain from significant information from such elements which is potentially possible which does not generate an output although receiving an input. Therefore, it is difficult for the information process system to correctly propagate an initial input pattern to the final information process stage.

Accordingly, it is impossible for the information process system to carry out a high-level complex learning function for processing really significant information.

SUMMARY OF THE INVENTION

The present invention was made in light of the problems mentioned above. Therefore it is an object of the invention to provide an information process system comprising a process circuit which can selectively propagate and process only really significant information.

Another object of the present invention is to provide an information process system having a high-level complex learning function.

Still another object of the present invention is to provide a process circuit for enabling various complex learning processes by separately carrying out learning processes of an input portion and an output portion by providing a control mechanism between the input and the output portion.

Still another object of the present invention is to provide a process circuit which can realize a learning method in which a state of the input portion is considered as an element potentially possible to generate significant information.

Accordingly, the present invention is characterized by a process circuit for processing information composed of significant information and insignificant information comprising:

(a) an input portion for selecting significant information from information inputted through a plurality of input terminals so as to recognize each significance degree of the significant information as a value showing an input state, (b) an operation circuit for carrying out a predetermined logic operation with the significant information from the input portion, (c) an output portion for comparing each significance degree of the significant information obtained from the logic operation results by the operation circuit with a predetermined threshold value, recognizing each significance degree obtained from the logic operation result as a value showing an output state when the significance degree is over the threshold value and outputting significant information having the significance degree, and outputting insignificant information when the significance degree is below the threshold value, further the output portion being so constructed as to suppress output of information in accordance with an output suppressing signal.

Namely, in the present invention, the process circuit is separated into an input portion and an output portion so that the respective two portions are in independent states. Second, the operational properties of these portions can be changed by control of the learning operation. Namely, the input operation and the output operation in the present invention are carried out independently. Third, since the function of suppressing the output is provided, it becomes possible to select only the information which is to be outputted, thereby enabling control of the learning process In the output portion.

Thus, according to the present invention, it becomes possible to construct an information process system including such a process circuit as mentioned above which demonstrates an excellent learning function. Moreover, since it is possible to independently carry out the output suppression and the learning process in the input portion and in the output portion, various learning processes become possible.

Namely, according to the present invention, since it is possible to recognize and strengthen an input pattern inputted to the process circuit and composed of significant information even in a stage where the circuit does not yet carry out the output operation, the input pattern can be correctly and certainly propagated in the circuit. Moreover, by this function, it becomes possible to easily realize a noteworthy mechanism of ordinary living things.

These and other objects, features and advantages of the present invention will be more apparent from the following description of a preferred embodiment, taken in conjunction with the accompanying drawings.

BRIEF DESCRIPTION OF THE DRAWINGS

FIG. 1a is a constructional block diagram to show the mechanism of an information process system related to the present invention;

FIG. 1b is a diagram to show truth values obtained by the information process system shown in FIG. 1a;

FIGS. 2 through 4 are diagrams to show truth values of logic operation circuits respectively used in process circuits shown in FIG. 1a;

DETAILED DESCRIPTION OF THE EMBODIMENTS

Hereinafter, an information process system in which a process circuit according to the present invention is described with reference to FIGS. 1 through 4.

Figures 1A, 1B:
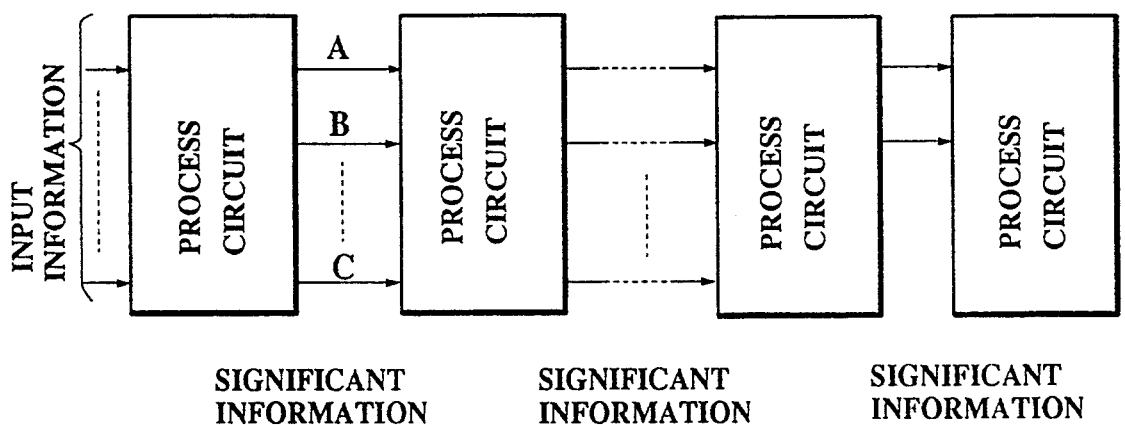

FIG. 1a is a diagram to show a mechanism of the information process system.

In FIG. 1a, the information process system is made by connecting a plurality of process circuits in series, and is so constructed that only significant information is propagated to the next process circuit in the information process, but unnecessary insignificant information recognized during the operation process is not propagated to avoid trouble in processing such information. Namely, among outputs A, B, C, for example, when the outputs A, C are recognized to be significant from the process result of the input information corresponding to these outputs in a process circuit at a first stage, only the outputs A, C are outputted to a process circuit at the next stage as significant information of, for example, the level "1". Then, in the circuit of the next stage, the same information process as that in the first stage is carried out with respect to the significant information obtained from the first stage. As a result, when there is an output corresponding to each item of significant information from the first stage and it is recognized to be significant from the process result, the output is propagated to the next stage as significant information. In such a manner, each process circuit carries out an information process with respect to only the information recognized to be significant at the previous stage, and outputs only information recognized to be significant for the process circuit of the next stage.

However, to construct a logic operation system for exclusively processing such significant information, it is necessary to employ a process circuit for carrying out a new type of Boolean operation process in which information is extended in the direction of time as compared with that seen in the conventional logic operation system.

Next, the new type of Boolean operation process is explained.

In this case, each significant result or item significant information obtained by each information process is expressed by "1", and each insignificant result or item of insignificant information obtained thereby is expressed by "0". Moreover, the length of existence or time duration of the "1" expressing the significant information corresponds to the degree of significance (necessity) of the significant information. Namely, the degree of significance of each item of significant information is expressed by the existence time of the "1". On the other hand, the insignificant information remains as "0" even if negated. Since there is a case where negation is required in the logic operation, it is inputted only to an output portion of the process circuit. In this case, NOT operation for negating only the significant information "1" is introduced. Accordingly, the NOT operation is expressed by truth values shown in FIG. 2.

Since the information to be propagated is only the significant information "1", the significant result exists for a predetermined time, thereafter the result becomes "0". Therefore, in this new type of Boolean operation, all the results become "0" after a predetermined time.

In the process circuit operated in such a manner, each output value becomes "0" except for an interval for which each item of significant information exists. Therefore, it is necessary to provide a storage portion for storing the significant information and an input portion for transferring the significant information to the storage portion.

Accordingly, by using such a process circuit, all the operation processes are processed in real time, and each output result is outputted to the next stage only when it is an item of significant information "1", while insignificant information "0" is suppressed and not outputted to the next stage.

Although such a logic process system is composed of the NOT operation and logic product (AND) or logic sum (OR) operation, it is possible to apply other logic circuits to the system in basically the same extending manner as described herein.

Among these logic circuits, the AND circuit and OR circuit are operated in accordance with truth values shown in FIGS. 3 and 4. In FIGS. 3 and 4, A(t), B(t) show input values at a time t respectively, C(t) shows output values corresponding to the input values A, B at a time t, C(t−1) shows output values a predetermined time before the time t, and C(t+dt) shows output values a predetermined time after the time t.

Hereinafter, a case in which these logic circuits are dealt with as threshold-value elements will be described. For example, as shown In FIG. 1b a threshold value is so provided that "1" is outputted if i or more inputs of n inputs are "1".

In this case, the function "or" is obtained when i=1, and the function "and" is obtained when i=all. For example, if A1 and A2 are given as inputs when i=1, a logical expression A1 or A2 becomes true if at least one of A1 and A2 is true.

Returning to FIGS. 3 and 4, the output values C(t) correspond to those to be outputted from the AND circuit or OR circuit. However, the output values C(t−1) and C(t+dt) are all "0", irrespective of input values.

Insignificant information "0" on the input side is obtained by negation of significant information "1" in the output portion of the previous stage. On the other hand, insignificant information "0" on the output side is not propagated, and only significant results "1" in this stage are propagated to the next stage.

In a logic process system composed of such logic circuits, important factors are:
(1) when from where and to where the significant information "1" is propagated,
(2) the synchronism of significant information, and
(3) distribution of the significance degree of the significant information.

Namely, in such a logic process system, since all the significant information is expressed by the same "1", it is necessary and important to compare or discriminate a plurality of "1" occurrences so as to realize various operation processes.

Therefore, the existence time or time duration of significant information "1" is adoped here as means for showing the degree of significance. As the means for showing the degree of significance, the number "1" of significant information continuing in a series of information processes or the appearance frequency of "1" in an input or output pattern in the propagation of information may be also adopted.

By introducing the degree of significance, it becomes possible to propagate the significant information in a suitable order.

Hereinafter, an embodiment of a process circuit in an information process system according to the present invention will be discussed with reference to FIGS. 5 to 8.

Figure 5:
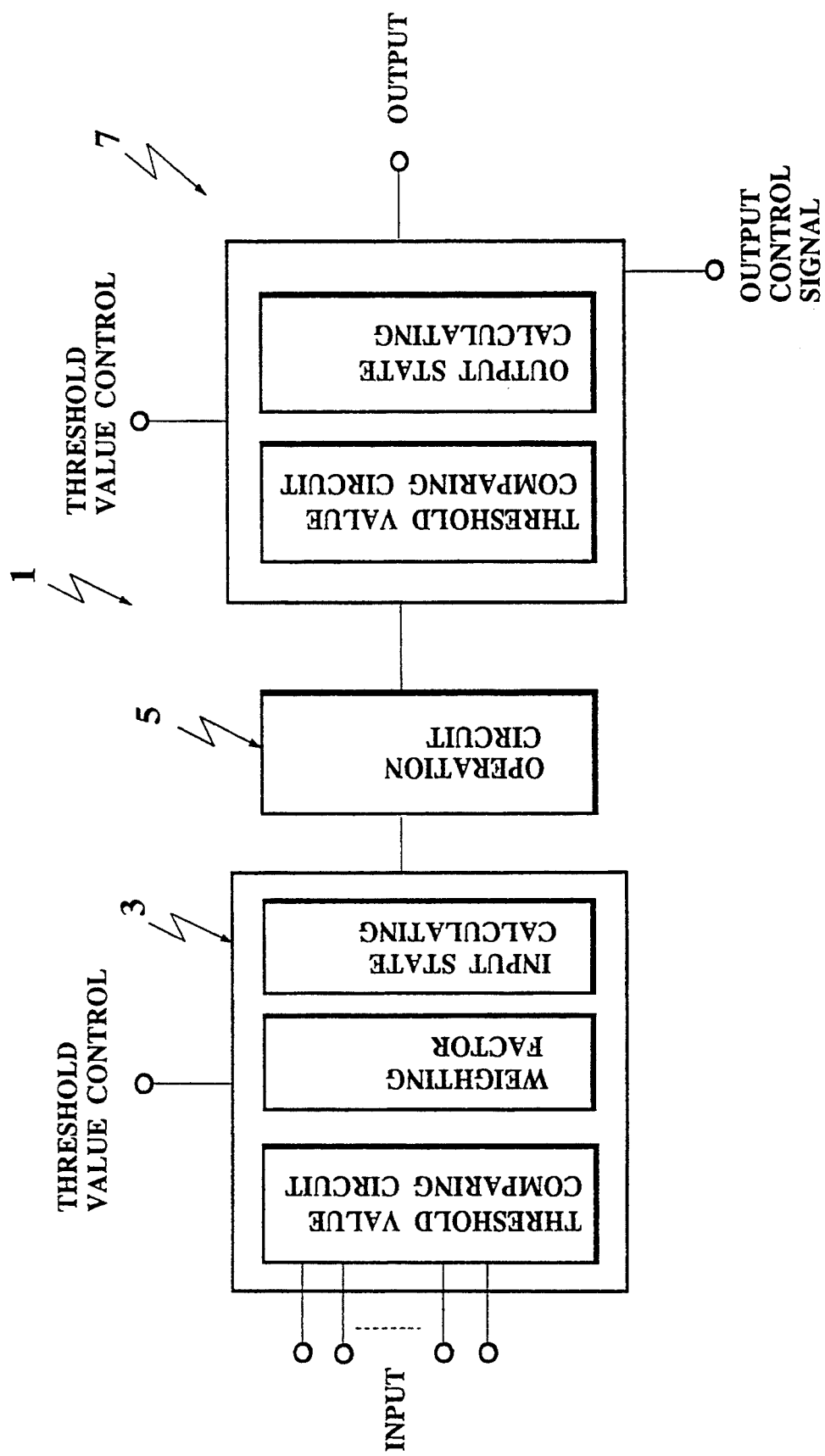
FIG. 5 is a constructional block diagram to show an embodiment of a process circuit in the information process system related to the present invention.

In FIG. 5, reference numeral 1 shows the process circuit. As shown in drawing, the process circuit 1 is composed of an input portion 3, an operation circuit 5 and an output portion 7. Of these components, the input portion 3 weights a plurality of items significant information "1" whose significance degrees (existence time) are greater than a predetermined first threshold value with a predetermined weighting factor, and calculates the sum of the weighted significance degrees of significant information as a value of an input state. The operation circuit 5 carries out predetermined logic operations corresponding to the significant information weighted by the input portion 3. Moreover, the output portion 7 compares the significance degrees obtained through the logic operations of the operation circuit 5 with a predetermined second threshold value, and recognizes each significance degree of the significant information as a value of an output state when it is greater than the second threshold value, and outputs the significant information in accordance with the output state calculated, while it outputs insignificant information when the significance degree is less than the second threshold value. Additionally, the output portion 7 performs the function stopping the outputting of significant information according to an output control signal.

Next, the operation of the process circuit 1 will be explained.

When a plurality of items of significant information is inputted to the input portion 3, each significance degree is compared with the predetermined first threshold value, then only the significant information having significance degrees greater than the first threshold value is picked up. The first threshold value is determined so as to control the learning operation in accordance with a state of the information process system. Next, the significant information picked up is weighted with the predetermined weighting factor, and the sum of the significance degrees of significant information is calculated and stored as an input state value. Then, the significant information having the significance degree stored as an input state value is outputted from the input portion 3 to the operation circuit 5 so as to carry out the predetermined logic operation. Thereafter, the results of the logic operation are provided from the operation circuit 5 to the output portion 7. When the significant information subjected to the logic operation is inputted to the output portion 7, the significance degrees are compared with the predetermined threshold value.

As result, when there is significant information having a significance degree greater than the second threshold value, the significance degree is calculated and stored as an output state value. Then, each item of significant information is outputted from the output portion 7 in accordance with each output state value. On the other hand, when there is no significant information having a significant degree greater than the second threshold value, insignificant information is outputted from the output portion 7.

When the output control signal is provided to the output portion 7, the output of information from the output portion 7 is suppressed and stopped. Moreover, the second threshold value is also determined so as to control the learning operation in accordance with the information process system.

Figure 6A:
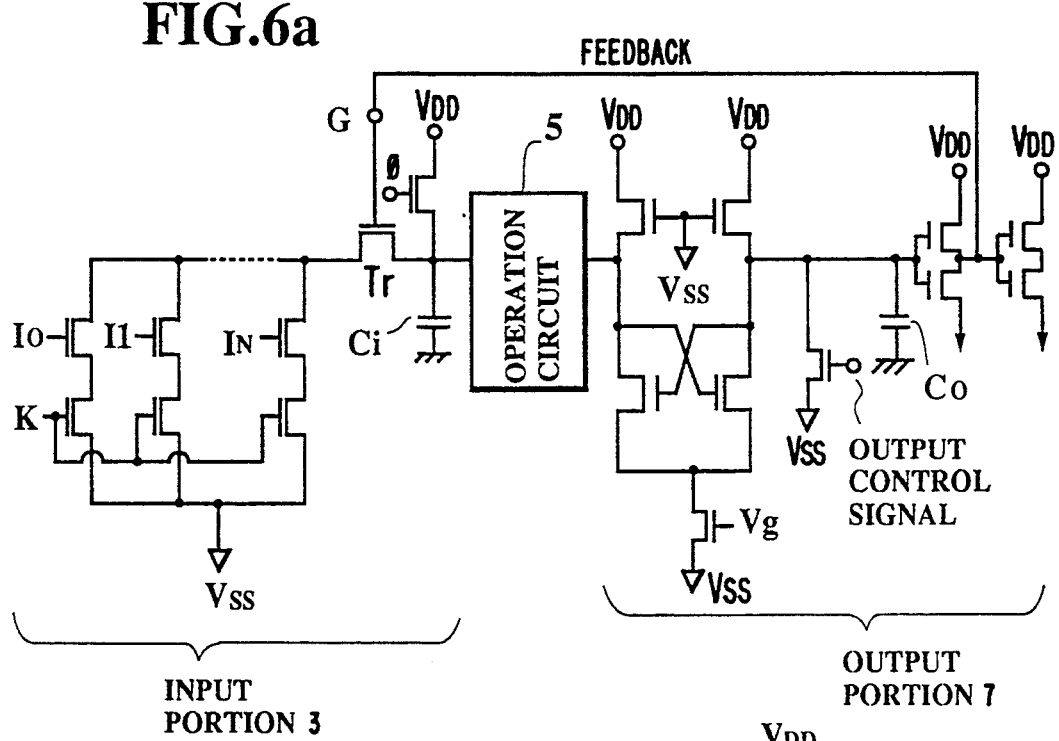
FIGS. 6a and 6b are diagrams to schematically explain the process circuit shown in FIG. 5.
Figure 6B:
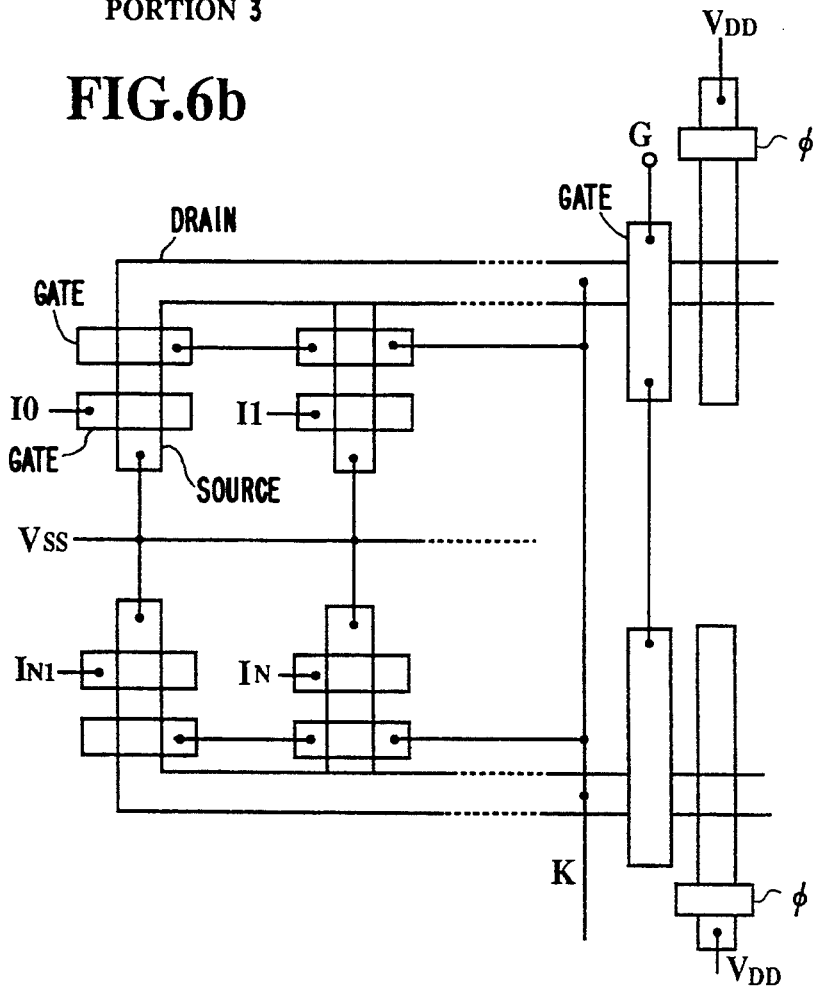

FIGS. 6a and 6b respectively show a circuit diagram and a plan view of a CMOS circuit which is an example of the process circuit 1 shown in FIG. 5.

In these drawings, the input state value stored in the input portion 3 and the output state value stored in the output portion 7 are stored in capacitors Ci, Co, respectively. In the circuit, a feedback signal from the output portion 7 is applied to a transistor Tr connected to an output terminal of the input portion 3 so as to prohibit output operation of the input 3 when the output portion 7 is carrying out the output operation.

Figure 7:
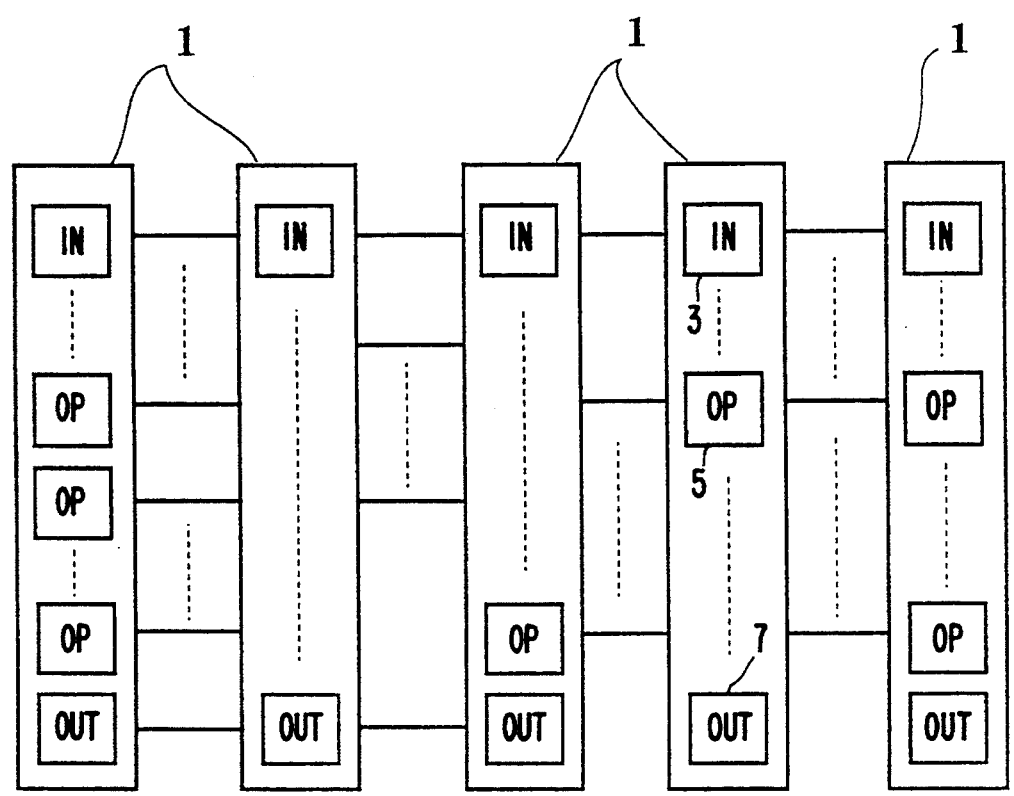
FIG. 7 is a construction diagram of a process circuit composed by arranging the process circuits shown in FIG. 5 in multiple layers.

FIG. 7 shows another process circuit which is made by arranging the process circuit 1 in multiple layers and this process circuit also has a similar operation to the circuit 1. In each layer of the multilayered circuit, an input signal is subjected to various weighting processes and operations to determine the significance of the signal. A process circuit which receives the output of a relatively large amount of significant information can output a control signal so as to urge learning of the following process circuit, or can scan an output state of previous stage and, if necessary, provide an indication to multiply the output. By these two control operations, the input or output state value of a process circuit can be controlled with ease.

To realize a process circuit in which the input process is the above type of, it is necessary to enlarge the learning sensitivity of the input portion in the process circuit. Namely, it is necessary to control the state of the input portion so it is able to learn easily. For example, this object is achieved by lowering the first threshold value which enables the learning state. On the other hand, to realize a process circuit in which the output process is of the above type, it is necessary to enlarge the learning sensitivity of the output portion in the process circuit. However, in the case of a process circuit in which the operation process is the above type of, since this operation has nothing to do with input and the output operations, the input and output portions can have the same or a like learning sensitivity. Accordingly, from the view point of learning sensitivity, it is preferred to divide the structure of the multi-layered process circuit into three portions, i.e., a front portion, a center portion and a rear portion.

Figure 8A:
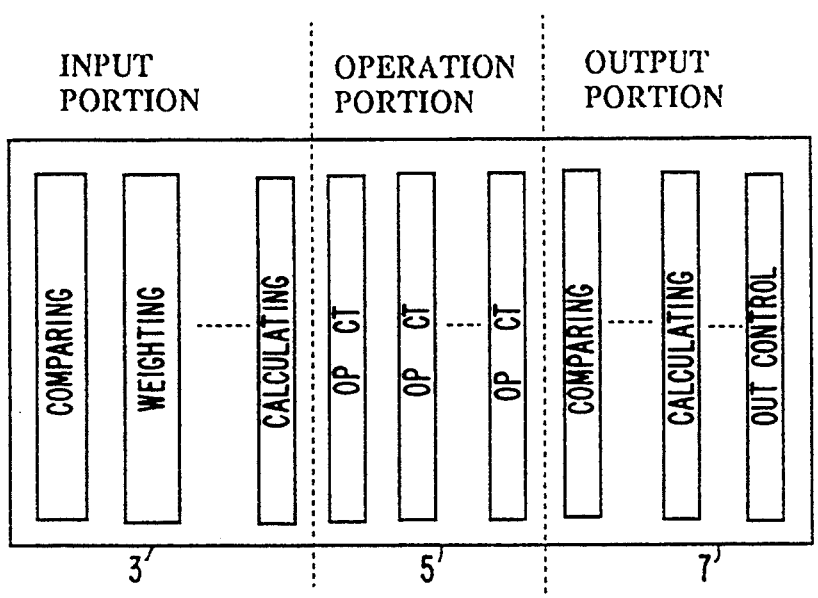
FIG. 8 is a block diagram of a process circuit in which the multi-layered process circuit shown in FIG. 7 is divided into three portions, i.e., an input portion, an operation portion and an output portion.
Figure 8B:
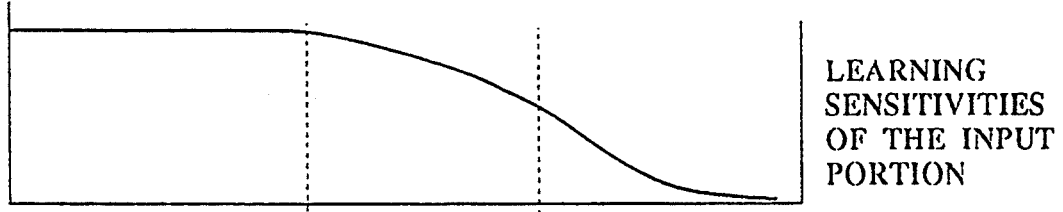
Figure 8C:
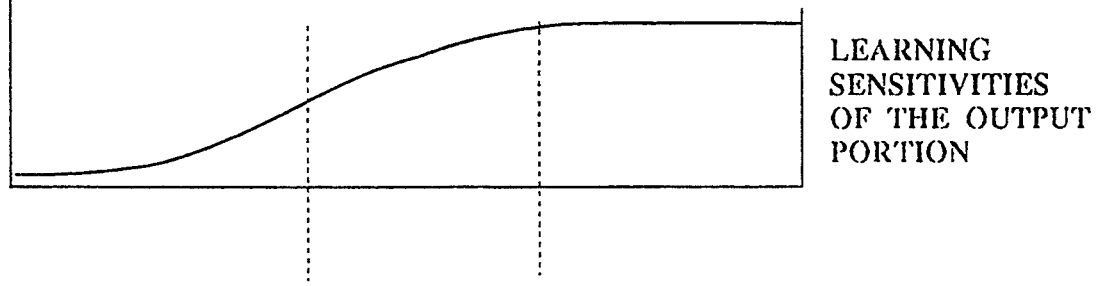

For example, the multi-layered process circuit is divided into three blocks so as to form the input portion, control portion and output portion, for example, by changing respective learning sensitivities of the input portions and output portions of respective elemental process circuits as shown in FIG. 8. In such a manner, it is possible to make a process circuit capable of a more complex process.

The present invention should not be limited to the embodiments mentioned above, but includes the following various concepts.

In the propagation of significant information, it is necessary to use an operator for calculating the significance degree to preferentially select significant information "1" to be as large as possible in number.

When the operator is expressed as C{z}, there is an example of C{z} expressed by a simple formula as follows:

$$C\{z\} = \Sigma i z i$$

where zi is a degree of identity to each Ii.

For example, when input information is expressed by "1011", and a standard pattern P which is predetermined and stored for calculating the significance degree of input information is "1010", and further an identical bit in the comparison of "1011" and "1010" is expressed by "1" and an unidentical bit therein is expressed by "0", z1 corresponding to the first bit (i=1) becomes "0", and z2~z4 corresponding to the second through the fourth bit (i=2~4) become "1". As result, the operator C in this case becomes 3. Then, by using such an operator, the significant information is preferentially propagated in the order of the significance degree. Incidentally, in the calculation operation for the significance degree, it is also possible to change the degree by learning.

Figure 9:
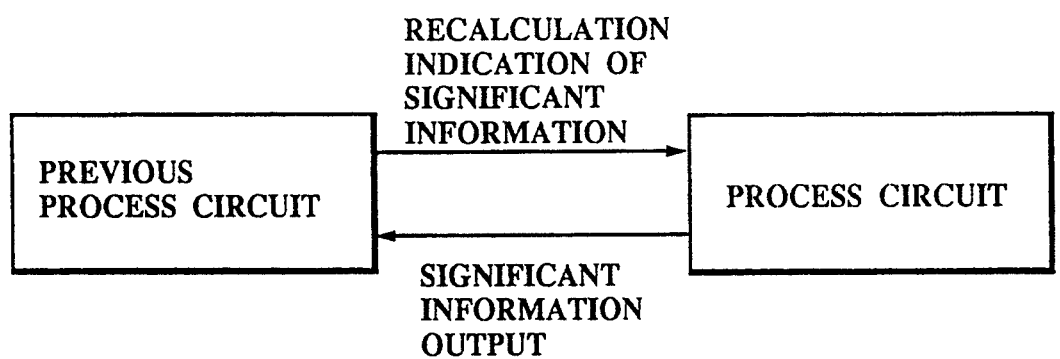
FIG. 9 is a diagram to show a function of a process circuit in the information process system shown in FIG. 1.

Since, all the significant information becomes "0" after a predetermined time in the selection operation, the time when the significant information is outputted and a time when the information is selected must be identical to each other. However, it is difficult to actually carry out the propagation and processing of the information with such timing. Therefore, as shown in FIG. 9, it is preferred that an elemental process circuit can perform a recalculation indication function for indicating that the previous stage should calculate significant information again. By the function, a process circuit in the previous stage selects significant information again from the information stored in a storage circuit thereof in accordance with the indication from the next stage, and again outputs the selected significant information to the next stage as a significant result.

Since the significance degree is developed in the direction of time, a bit row of a given instant occasionally has no sense. Namely, the significance degree has a sense in a value obtained by integration over an interval or a relative value between respective components. Moreover, all the significance degrees for the respective items of information are collected to drive an elemental process circuit of the next stage.

Next, a method of preferentially propagating significant information by an operation system other than the Boolean operation system, which is composed of mathematical mapping on a vector space is provided.

In such a logic process system including the identity operation, the following is an example of a description of a design method for a process circuit.

In a process circuit for realizing such operation, x, y, z are literals, an input portion for inputting x is $|x>$, an output portion for outputting y is $<y|$, and an identity operation of x and y is expressed as $z=<x|y>$. Moreover, using an operator op, a unary operation is expressed as $op|x>$; and a binary operation is expressed as $|x>op|y>$ and so on.

Another process circuit has an input x, an operation process op and an output y is expressed as $<y|op|x>$. Incidentally, $<|>$ satisfies the following relations.

$$1 = <0|0> = <1|1>$$

$$0 = <0|1> = <1|0>$$

Generally, an information process is comprises repetitively of judging and processing information. The judgement by an information means comprises recognition of identity of the information and evaluation of the recognition results.

When an input pattern is p1, an output pattern is p2 and a map from the input x to the output y is expressed by f(x: p1; y: p2), and development in the direction of space of p1 is denoted as a literal row such as $|10011011101>$, further development in the direction of the time axis is obtained by dividing such a literal row with ";" and is expressed as $|100;111;101>$. The input operation of p1 to x is described as $<x|p1>$. Therefore, when an operational row to f is given as fop, f can be expressed as follows:

$$<p2|y><y|fop|x><x|p1>.$$

The description shows such a circuit operation as to carry out a process where the identity operation of x and p1 is established, the operation including fop is executed, then p2 is outputted when the operation result becomes p2.

For example, when

```
fop = AND;
          /*2input1output1*/
p1 = | 00; 01; 11; 10>;
          /*4clock*/
p2 = <0; 0;0, 0;1, 0;0, 0 |
          /*8*1/2clock*/,
``` respective connection descriptions become as follows:

$|x> = |x><x|p1>;$ $|y> = |y><y|AND|x>;$ $|out> = |out><p2|y>;$ and the development of fop by projective operators becomes as follows:

$|y><y|fop|x><x| = \Sigma 1a1 Proj1;$ $\Sigma 1a1 <p2|Proj1|p1>.$

Accordingly, the significance degrees can be decomposed as projection values of the respective components, so that they can be directly expanded into a characteristic space. When the significance degree of the input is E, and each significance degree of the components is e, E is expressed as follows:
 E=(e1, ..., en). Therefore, operations between significance degrees can be regarded as a rotation of vectors in the characteristic space.

When the significance degrees are now E1, E2, the following operations f(E1, E2) can be mentioned as the operations between significance degrees except AND, OR.

(1) Comparison:  E1−E2>TH → Eout = E1−E2;
                 E1−E2<TH → no Eout;
(2) Selection:   E1−E2>TH → Eout = E1;
                 E1−E2<TH → Eout = E2;
(3) Strengthening: E1+E2>TH → Eout = E1+E2;
(4) Gate: TH = 0   E1 → Through;
          TH = High  E1 → Inhibit.

By using fundamental operations as said above, it becomes possible to make complex functional elements such as decoders and ALU. In order to decode E1 of complex information, it is necessary to enable control of TH in the above operations. However, the same effect can be obtained by adding E2.

If the input literals are so expressed in the form of vectors as X, Y and the significance degree is denoted as E, so as to show the connection relation between input-output elements of a combined matrix, each matrix element shows each weight of the combination.

Namely, the relation can be expressed as:

$[M] = |Y><X|.$

Moreover, the conversion relation of the significance degree becomes as follows:

$[E(Y)] = [M][E(X)].$

Next, when an initial matrix shows the number of the initial combination between the elements, and the combination factor is changed into [M'] in the diagonal form by a learning process, the significance degree E(X) of input X is projected onto a base component, thereby obtaining E(Y) as an output. Accordingly, the significance degree of significant information can be composed of significance degrees corresponding to respective characteristic components.

Next, a process flow from in to out of information propagation in a neurocell will be considered on the basis of the significance evaluation by the projection operation as mentioned above.

When an input circuit inputting (in, a) as an input is $|in, a>$, an output circuit outputting f as an output is $<f|$, and a connection relation matrix of f is expressed as $|f><f|$, a circuit composed of two stages, the first one of which has a single output target, is expressed by the following formula:

$|ot> = |ot><ot|f><f|in, a>.$

According to this formula, in and a are processed at the first stage and f is outputted.

Then, to control the flow, process circuits P1, P2 and a control signal u are further added to obtain a new formula as follows:

$|ot> = |ot><ot|P2|u, f><f|P1|in, a>.$

In this formula, when f is more significant than P1, P2 is executed subsequently. Moreover, when a result which is more significant can be obtained thereafter, ot is outputted. As a result, the program comprising P1, P2 is completed. To the contrary, when f is insignificant, P2 is not executed so that ot is not outputted. As shown in the formula, P1, P2 are controlled by the control signal u reversely directed against the direction from in to out. Accordingly, the two process circuits Pl, P2 have a mutual relation to, and influence on, each other.

Next, a case in which a plurality of outputs are outputted from the first state of P1 will be considered.

In this case, the two-stage circuit is expressed as follows:

$|ot> = |ot><ot|P2|ui, fi><fi|P1|in, a>,$ where this formula means the sum of $|ot> = |ot><ot|P2|u, f><f|P1|in, a>$ with respect to i.

In this case, when ui=u and uj=not u, fi and fj can be selected in accordance with values of u. Similarly, when fi=f and fj=not f, it becomes possible to provide control for operating P2 in accordance with values of u.

Such a process flow can be also realized by known random logic circuits. In such a method based on random logic circuits, if an error from an expected value is used as each u, a so-called backward propagation method can be established.

As stated above, since it is enough for the information process in such an information process system to note only significant information, the process work can be sharply reduced and simplified even when the amount of information or the process contents are considerably increased.

Next, the general idea of the information process in which there is introduced the significance E will be described.

First, the identity process is considered. The simplest comparison process can be realized by the AND operator based on only a judgement of 1 or 0. The second more complex process for the AND operator is an operator for deciding an order of preference of a plurality of signals inputted. Moreover, in a further more complex comparison process, the output values are decided on the basis of the numbers or input frequencies of "1" and "0" inputted at a certain time.

Now, a case in which the significance degree is defined on the basis of a simple identity operation will be considered.

Namely, the identity degree is defined as the number of equal bits by an identity operation for recognizing the number of combinations of storage data y and input data x of equal bit width. Since each operation result corresponding to each bit is $zi = <yi|xi>$, the identity degree is given as $C\{z\} = \Sigma zi$.

In the same manner as mentioned in case of the threshold value logic, when the identity degree C is over a threshold value TH, the output value of "1" is obtained. Differing from Boolean operation, outputs of the significant logic circuit disappear after a predetermined time. Accordingly, the significance degree E can be defined as a continuance time or output frequency of "1" in a fixed period. For simplification, an element in which the significance degree E is the continuance time of "1" is now considered as the significant logic element used in the operation process. In this case, patterns of such significant logic elements for the first and the second stage are considered as follows.

Generally, from the viewpoint of energy corresponding to the significance of information, the significance degree relates to output energy EO in the second stage, where the output energy is defined as a difference between the internal energy of the element and the potential energy therearound. When the output energy becomes greater than a threshold value THOT, an output process is started. Then, when the output energy is all discharged, the output is stopped.

On the other hand, input energy EIN is generated in accordance with the result of the first stage. There are various operation modes applicable for the operation in the first stage, however, a simple weight addition is considered as such here. In this case, when the input energy EIN becomes greater than a threshold value THIN, an output operation is started. As a result, the output energy EO stored in the output side is discharged. After the discharge of the output energy, the operation on the input side is prohibited till the next output energy is stored. The period of prohibition is generally called the insensitive period. On the input side, there is provided an attenuation mechanism for erasing operation results after a predetermined time when the input energy EIN does not exceed the threshold value THOT.

An example of a program for such an operation is shown as follows:

```
<HP<IGT;<PROC>IGT4S(PT,CP,CN,J0,J1,I0,I1,I2,I3,);
<SIG>PT<0:3>,CN,CP,JI,IJ;
<INT>PI=4,TH=3,EOT=1,EIN=0,Q0=8,Q1=8;
<START>
IF EOT=>TH THEN
EOT=EOT-(Q0*STI(J0)+Q1*STI(J1))/2;
IF EOT<<0 THEN EOT=0;ENDIF;
IF EOT>>THE THEN
Q0=Q0+IF Q0<<24 THEN STI(J0)ELSE 0 ENDIF;
ENDIF;
ENDIF;
IF EIN=<TH THEN
IF EOT>>TH THEN
EIN=(Pi*STI(Ii)-STI(PT))/4;ELSE EIN=0,
EOT=EOT+1;ENDIF;
IF EIN<TH THEN
EIN=EIN-1;ELSE EOT=EOT+EIN;ENDIF;
IF IGT'=1B0 THEN IGT=1B0;ENDIF
```

```
-continued
ELSE
IF EOT>>THE THEN IF IGT'=1B1 THEN IGT=1B1;
IF Ii THEN IF Pi<<12 THEN Pi=Pi+1;ENDIF;
ELSE IF Pi>>4 THEN Pi=Pi-1;ENDIF;ENDIF;
ENDIF;EOT=ENT-2;
ELSE EIN=0; EOT=0;ENDIF;
ENDIF;
```

This program can be made easily with MOS transistors and capacitors. Weighting the significance of information on the input end can be realized by changing the drivability of MOS by EPROM. When the simulation is carried out in accordance with Hebb's rule, the program realizes a similar operation to that by a neural net where ordinary sigmoid elements are used. The program can also realize operations such as competition learning and error propagation by changing the number of connection of elements.

By the way, with respect to the relation between digitalization of the connection factors or outputs of elements and the focusing degree of learning, Inomata et al. (cited below) has reported as follows:

(1) The connection factors can be reduced to several bits, with and the outputs of one bit consisting of 0 and 1. It is also possible to use a threshold value function in place of the sigmoid function.

(2) By changing the error propagation algorithm, it becomes possible to use a minute constant in place of the first-order differential coefficient. Additionally, a result of study concerning the most suitable way of focusing the learning operation is also reported. (See Inomata, Takeuchi, Nakayama, "Study on Reduction of the Number of Bits in the Digital Type Error Reverse Propagation Mode," Shingaku Giho, NC89-41, pp.51–56 (1989))

However, since the output obtained from this mode is dealt with in digitalized form, the focusing ability of the learning process is degraded by oscillation of results obtained from learning.

Moreover, since the output is changed from 1 to 0 after a predetermined time, the circuit operations become a little different from the above non-digitalization mode. Furthermore, since the output operations between the respective elements are not synchronous to each other, and an operational period of each element depends on the output energy, an operation of the whole body composed of all the elements should be based on the period. By this operation, it also becomes also possible to realize a circuit which is so constructed that all the outputs from elements can be processed even when the same inputs are applied to the circuit. However, to exactly know a specific input-output relation in the whole body of circuit, it is not sufficient to weight information at the input end of each element, but it is also necessary to get mutual action between the respective elements. Next, considering the suppression effect, activity through the whole body of the circuit is degraded when it is strengthened, while the activity is increased when weakened. It seems that this fact can be applied to neural cells. Namely, the ratio of suppression type neural cells among the neural cells is limited to a certain range.

There are two methods of controlling the significance degree operation, one of which is to change the degree of activity of elements by changing the respective threshold values, and the other is to rewrite the data stored. To carry out dynamic control, method (1) is used, while the method (2) is used to control a longterm change corresponding to alteration of the operation.

To discriminate input signals related to these two methods respectively, ones related to (1) are designated by a parenthesis "( )", and the others related to (2) are designated by a bracket "[ ]".

As a result, such a significance degree operation as above is expressed as follows:

$$<u, c|[mem], (thr1, thr2), i1, i2, i3>.$$

Moreover, data provided for comparison with the input data are expressed in a character "# #".

Then, the resultant formula of the operation becomes as follows:

$$<u, c|\#010\#[mem], (thr1, thr2), i1, i2, i3>.$$

Similarly, the output data are described as follows:

$$<u, c\#111\#|\#010\#[mem], (thr1, thr2), i1, i2, i3>.$$

The propagation pattern is produced on the basis of the initial energy (initial significance degree), and then a mode for giving and receiving energy for showing the significance degree to the information process system during the information propagation in the system is considered. When the system completes the pattern process, the pattern is converted into a new pattern PJ as follows:

$$PJ = |P> <Pj|int|PO>.$$

The energy for showing the significance degree of the pattern is denoted by E. Moreover, each process route in the pattern and energy of the route are respectively expressed as W and E(W). As seen in a general dynamic system, the energy distribution in a stable pattern on each process route is uniform.

As stated above, according to the present invention, it becomes possible to separately know states of the input and the output portion of an information process system, thereby realizing a precise and effective information process. Moreover, since it becomes possible to independently carry out control and learning to the input and the output portion, various learning modes can be used for processing information.

Various modifications will become possible for those skilled in the art after receiving the teachings of the present disclosure without departing from the scope thereof.

What is claimed is:

1. A process circuit for processing information composed of significant information and insignificant information, comprising:

(a) an input portion for selecting significant information from information inputted through a plurality input terminals and for recognizing each significance degree of said significant information as a value showing an input state, said significance degree being defined and determined by a duration time of the input state of said significant information;

(b) an operation circuit for carrying out a predetermined logic operation with said significant information propagated from said input portion; and (c) an output portion for comparing said each significance degree of said significant information obtained from logic operation results from said operation circuit with a predetermined threshold value, and for recognizing each significance degree obtained from said logic operation results as a value showing an output state when said significance degree is over said threshold value so that significant information having said significance degree is output, and when said significance degree is below said threshold value insignificant information is output.

2. A process circuit according to claim 1, wherein said output portion suppresses an output of information in accordance with an output control signal.

3. A process circuit according to claim 1, wherein said input portion weights selected significant information with a predetermined weighting factor.

4. A process circuit according to claim 1, wherein said predetermined threshold value is controllable.

5. An information process system for propagating only significant information from among information composed of significant information and insignificant information, comprising:

a plurality of process circuits connected in series, each of said process circuits including (a) an input portion for selecting significant information from information inputted through a plurality of input terminals and for recognizing each significance degree of said significant information as a value indicating an input state;

(b) an operation circuit for carrying out a predetermined logic operation with said significant information propagated from said input portion; and (c) an output portion for comparing said each significance degree of said significant information obtained from results of said logic operation by said operation circuit with a predetermined threshold value, for recognizing said each significance degree obtained from said results of said logic operation as a value indicating an output state when said significance degree is over said threshold value and for outputting significant information having said significance degree, and outputting insignificant information when said significance degree is below said threshold value.

6. A circuit for processing information comprising:

an input selecting circuit, receiving input information comprising significant information and insignificant information, for selecting said significant information from said input information and for determining a significance degree value of said significant information, said significance degree value indicating an input state, said significance degree value consisting of a time duration of said significant information;

an operation circuit, receiving said significant information from said input selecting circuit, for performing a predetermined logic operation with said significant information and for outputting logic operation results of said logic operation, said logic operation results including said significance degree value of said significant information; and an output comparison circuit, receiving said logic operation results from said operation circuit, for comparing said significance degree value with a predetermined threshold value, for determining said significance degree value indicates an output state when said significance degree value is greater than said predetermined threshold value to output said significant information and for outputting insignificant information when said significance degree value is less than said threshold value.

7. The process circuit of claim 6, wherein:
said output comparison circuit is responsive to an output control signal for selectively suppressing said significant information or said insignificant information.

8. The process circuit of claim 6, wherein:
said input selecting circuit further weights said significant information in accordance with a preselected weighting factor.

9. The process circuit of claim 6, wherein:
said output comparison circuit further controls said predetermined threshold value.

* * * * *